No. 870,087. PATENTED NOV. 5, 1907.
A. W. M. DICKENS.
COMBINED MEASURING GLASS AND PESTLE AND MORTAR.
APPLICATION FILED DEC. 17, 1906.
MODEL.

Witnesses
George Fredric Rayner
Frank William Pattison

Inventor
Arthur William Martin Dickens
per Rayner & Co
Attorneys

UNITED STATES PATENT OFFICE.

ARTHUR W. M. DICKINS, OF BROMLEY, ENGLAND.

COMBINED MEASURING-GLASS AND PESTLE AND MORTAR.

No. 870,087.　　　　　Specification of Letters Patent.　　　　　Patented Nov. 5, 1907.

Application filed December 17, 1906. Serial No. 348,201. (Model.)

*To all whom it may concern:*

Be it known that I, ARTHUR WILLIAM MARTIN DICKINS, a subject of the King of Great Britain and Ireland, residing at 11 Market Square, Bromley, in the county of Kent, England, have invented certain new and useful Improvements in a Combined Measuring-Glass and Pestle and Mortar, of which the following is a specification.

This invention relates to articles more especially for use in photography but also applicable for other purposes and consists of a measuring glass which also serves as a mortar in which materials may be crushed by a suitably formed pestle.

Photographic materials are frequently supplied in the form of tablets which have to be dissolved in water and to facilitate this they should be broken and ground. My present device enables this to be done in the vessel in which they are to be dissolved the vessel being in the form of a measuring glass so that the proper quantity of water is added to the powdered material or the tablets may be crushed under water.

Figure 1:
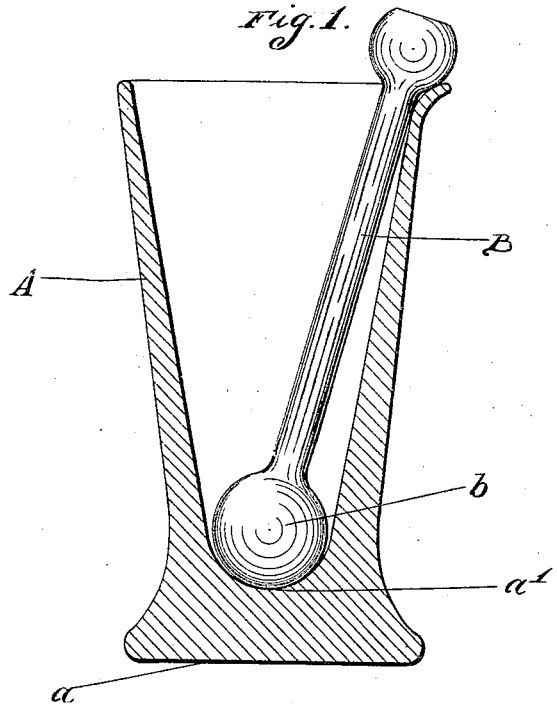
Figure 2:
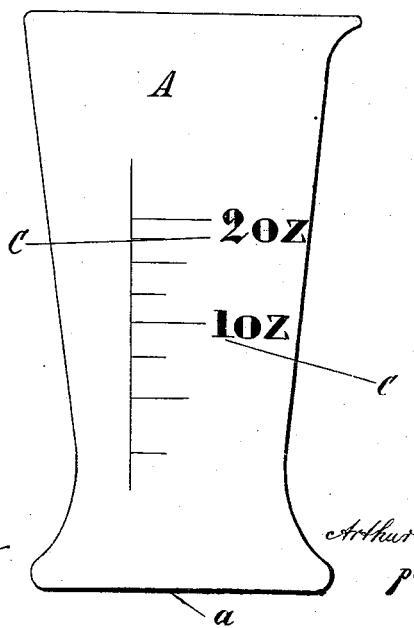

In order that the invention may be more clearly understood, reference is had to the accompanying drawings in which Figure 1 shows the vessel in section and Fig. 2 in elevation.

The vessel A is of thick glass with a flat bottom $a$ the thickness of the bottom giving sufficient strength to prevent any danger of injury during the crushing. The lower end $a^1$ of the cavity of the glass is rounded or spherical and the pestle B, also for preference of glass, has the rounded end $b$ which fits with tolerable accuracy in the part $a^1$ only slight play being allowed. The close fitting of these parts enables the crushing to be done very expeditiously and if water is already in the vessel without danger of splashing.

The vessel is shown in Fig. 2 graduated at C into ounces and parts of an ounce or any other measure which may be employed. Owing to the fact that the water is measured in the vessel which serves for the crushing there is no chance of loss of the material or waste of time in manipulating, thus greatly expediting the work.

What I claim as my invention and desire to secure by Letters Patent is:—

A combined pulverizing and measuring instrument comprising a glass mortar with a thick base and transparent sides, a concave crushing cavity in said base, graduations marked on said sides and a pestle having a round end fitting closely in the crushing cavity as herein described.

In witness whereof I have hereunto set my hand in the presence of two witnesses.

ARTHUR W. M. DICKINS.

Witnesses:
　W. F. MASTERS,
　P. E. W. HOWLAND.